United States Patent
Kim et al.

(10) Patent No.: US 10,200,755 B2
(45) Date of Patent: Feb. 5, 2019

(54) DISPLAY DEVICE AND METHOD OF OPERATING THE SAME

(71) Applicant: LG ELECTRONICS INC., Seoul (KR)

(72) Inventors: Jinseong Kim, Seoul (KR); Sunho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/455,076

(22) Filed: Mar. 9, 2017

(65) Prior Publication Data

US 2017/0311025 A1   Oct. 26, 2017

(30) Foreign Application Priority Data

Apr. 22, 2016   (KR) .................. 10-2016-0049615

(51) Int. Cl.
```
H04N 21/23       (2011.01)
H04N 21/443      (2011.01)
H04N 21/4363     (2011.01)
```
(52) U.S. Cl.
CPC ... *H04N 21/4432* (2013.01); *H04N 21/43637* (2013.01)

(58) Field of Classification Search
None
See application file for complete search history.

(56) References Cited

U.S. PATENT DOCUMENTS

| | | |
|---|---|---|
| 2013/0219072 A1 | 8/2013 | Han et al. |
| 2015/0061972 A1 | 3/2015 | Seo et al. |
| 2015/0082058 A1* | 3/2015 | Hahm .................. G06F 3/1454 713/320 |
| 2015/0350739 A1 | 12/2015 | Miller et al. |

FOREIGN PATENT DOCUMENTS

KR   1020160031724   3/2016

OTHER PUBLICATIONS

PCT International Application No. PCT/KR2017/003591, International Search Report dated Jul. 20, 2017, 3 pages.

* cited by examiner

*Primary Examiner* — Cai Y Chen
(74) *Attorney, Agent, or Firm* — Lee Hong Degerman Kang & Waimey

(57) ABSTRACT

A display device having a display, a device interface to permit communication with an external device using at least one wireless communication protocol, a network interface for coupling to a network and a controller. The controller is configured to: cause the display to display data mirroring data displayed on an external device; receive a request for playback of content, wherein the request for playback of the content is received from the external device via the device interface; obtain the content from a storage unit when the content is non-streaming content; obtain the content from a source, via the network interface, when the content is streaming content; cause the display to display the content obtained from either the storage unit or the source; and transmit, via the device interface, a first message to the external device to cause the external device to enter a standby mode.

12 Claims, 15 Drawing Sheets

DISPLAY DEVICE AND METHOD OF OPERATING THE SAME

CROSS-REFERENCE TO RELATED APPLICATIONS

Pursuant to 35 U.S.C. § 119(a), this application claims the benefit of earlier filing date and right of priority to Korean Application No. 10-2016-0049615, filed on Apr. 22, 2016, the contents of which are hereby incorporated by reference herein in their entirety.

FIELD OF THE INVENTION

The present invention relates to a display device and a method of operating the same.

DISCUSSION OF THE RELATED ART

A digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, for example, Internet search, home shopping, online games, and the like based on such interactivity.

In addition, recently, a display device may provide a screen mirroring function to display an image of an external device such as a smartphone of a user on the display device.

SUMMARY

A display device having a display, a device interface to permit communication with an external device using at least one wireless communication protocol, a network interface for coupling to a network and a controller. The controller is configured to: cause the display to display data mirroring data displayed on an external device; receive a request for playback of content, wherein the request for playback of the content is received from the external device via the device interface; obtain the content from a storage unit when the content is non-streaming content; obtain the content from a source, via the network interface, when the content is streaming content; cause the display to display the content obtained from either the storage unit or the source; and transmit, via the device interface, a first message to the external device to cause the external device to enter a standby mode.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION

Hereinafter, embodiments will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, is an artificial display device that adds a computer supporting function to a broadcast receiving function, can have an easy-to-use interface such as a writing input device, a touch screen, or a spatial remote controller as an internet function is added while fulfilling the broadcast receiving function. With the support of a wired or wireless internet function, it is possible to perform an e-mail, web browsing, banking, or game function with access to internet and computers. In order for such various functions, standardized general purpose OS can be used.

Accordingly, since various applications are freely added or deleted on a general purpose OS kernel, a display device described herein may, for example, perform various user-friendly functions. The display device, in more detail, can be network TV, HBBTV, smart TV, LED TV, OLED TV, and the like, and in some cases, can be implemented as a smartphone.

As will become apparent, embodiments may reduce power consumption by changing a power mode of an external device to a standby mode when a display device provides a screen mirroring function. User convenience may be increased by retrieving content corresponding to a request signal from an external device from various storage media. Image playback with resolution higher than that of an image played back on an external device upon providing a screen mirroring function may also be realized.

As used herein, the term "mirroring" refers to the scenario that includes the displaying of data on one device that is visually the same or similar to that currently displayed on a connected device, and the term "streaming" refers to the scenario that includes the displaying of data (e.g., video) on a device in real time as it is being received at the device, subject to any desired or necessary buffering at the device.

Figure 1:
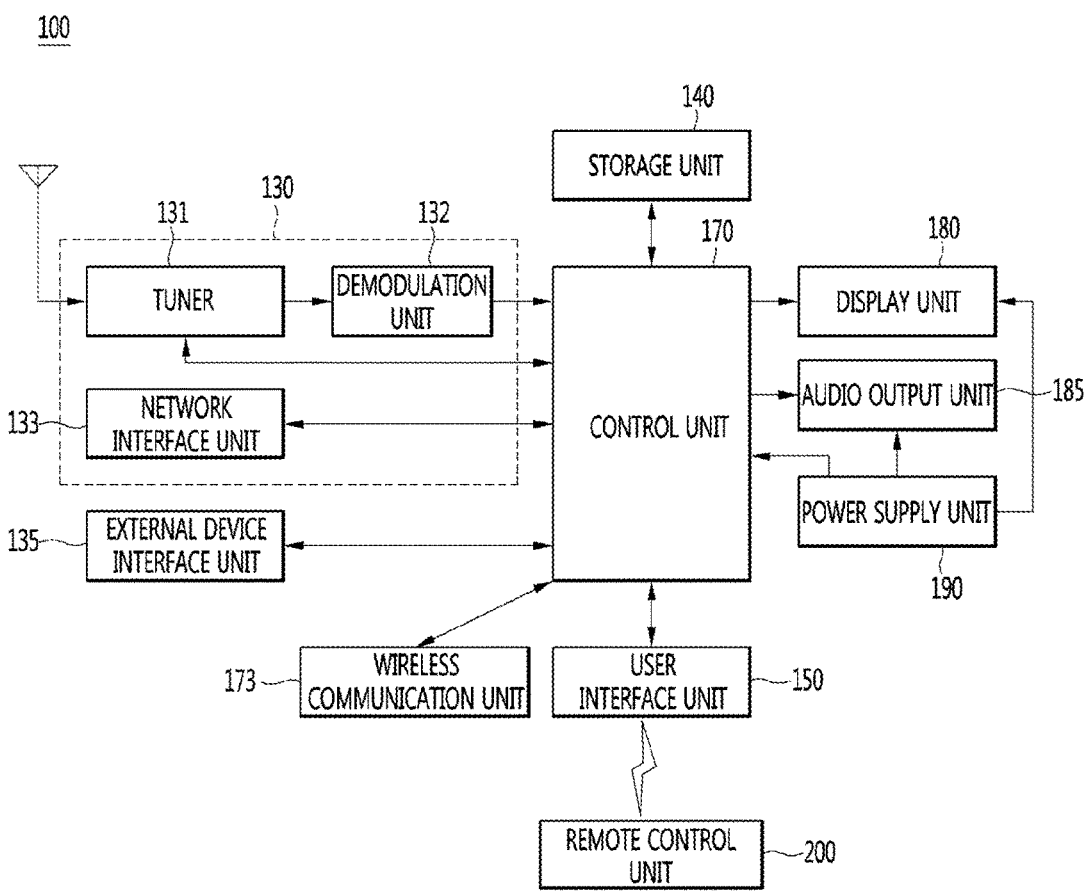
FIG. 1 is a block diagram showing components of a display device according to an embodiment of the present invention.

FIG. 1 is a block diagram showing components of a display device according to an embodiment of the present invention. This figure shows a display device 100 that includes a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 may include a tuner 131, a demodulation unit 132, and a network interface unit 133. The tuner 131 may select a specific broadcast channel according to a channel selection command. The tuner 131 can receive broadcast signals for the selected specific broadcast channel. The demodulation unit 132 divides the received broadcast signals into video signals, audio signals, and broadcast program related data signals and restores the divided video signals, audio signals, and data signals to an output available form.

The external device interface unit 135 may receive an application or an application list from an adjacent external device and deliver it to the control unit 170, the storage unit 140, or both. The external device interface 135 may provide a connection path between the display device 100 and an external device. The external device interface 135 receives at least one of an image or audio output from an external device that is coupled to (e.g., wirelessly or wired) the display device 100 and deliver it to the control unit. The external device interface unit 135 may include a plurality of external input terminals. Examples of the plurality of external input terminals include an RGB terminal, a High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185. Examples of external devices connectable to the external device interface unit 130 include a set-top box, a Blu-ray player, a DVD player, a game console, a sound bar, a smartphone, a PC, a USB memory, a home theater system, and the like.

The network interface unit 133 typically provides an interface for connecting the display device 100 to a wired/wireless network including the internet. The network interface unit 133 can transmit or receive data to and from another user or another electronic device through an accessed network or another network linked to the accessed network. Additionally, content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through a network. The network interface unit 133 can then receive content or other data provided from a content provider or a network operator. That is, the network interface unit 133 can receive content such as movies, advertisements, games, VODs, and broadcast signals, which are provided from a content provider or a network provider, through a network, and information relating thereto.

The network interface unit 133 can also receive firmware update information and update files provided from a network operator and transmit data to the internet or content provider or a network operator. The network interface unit 133 can select and receive a desired application among available applications via a network.

The storage unit 140 typically stores a signal-processed image, voice, or data signals stored by a program to support signal processing and control in the control unit 170. The storage unit 140 can also temporarily store image, voice, or data signals output from the external device interface unit 135 or the network interface unit 133 and can store information on a predetermined image through a channel memory function. The storage unit 140 can also store an application or an application list input from the external device interface unit 135 or the network interface unit 133.

The display device 100 can play or otherwise display content (for example, video files, still image files, music files, document files, application files, streaming video, and the like) stored in the storage unit 140 or other location.

The user input interface unit 150 can deliver signals input from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra-Wideband (WB), ZigBee, Radio Frequency (RF), and IR. The user input interface unit 150 can also provide, to the control unit 170, control signals input from keys (not shown) such as a power key, a channel key, a volume key, and a setting key.

Image signals that are image-processed in the control unit 170 can be input to the display unit 180 and displayed as an image corresponding to corresponding to the image signals. Additionally, image signals that are image-processed in the control unit 170 can be input to an external output device through the external device interface unit 135.

Voice signals processed in the control unit 170 can be provided to the audio output unit 185. These voice signals can also be provided to an external output device through the external device interface unit 135.

The control module 170 generally provides for control of overall operations in the display device 100. For instance, the control unit 170 can control the display device 100 by user command or internal program input through the user input interface unit 150 and download a desired application or application list into the display device 100 via access to network. The control unit 170 can output channel information selected by a user together with a processed image or voice signals through the display unit 180 or the audio output unit 185.

Additionally, according to an external device image playback command received through the user input interface unit 150, the control unit 170 can output image signals or voice signals of an external device such as a camera or a video recorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140. In this case, an image displayed on the display unit 180 can be a still image or video and also can be a 2D image or a 3D image.

The control unit 170 can also play content stored in the display device 100, received broadcast content, and external input content input from outside the device, and the content can be in various formats such as broadcast images, external input images, audio files, still images, accessed web screens, document files, and the like.

The wireless communication unit 173 can perform a wired or wireless communication with an external electronic device and other devices. The wireless communication unit 173 can perform short-range communication with an external device using one or more of a variety of different communication technologies. Examples of such short-range communications include Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies.

The wireless communication unit 173 can support wireless communication between the display device 100 and a wireless communication system, between the display device 100 and another display device (which may implemented using any of the device configuration as display device 100), and between networks including the display device 100 and another display device through wireless area networks. The wireless area networks can be a wireless personal area network.

Display device 100 (and similarly other display devices or external devices) may be implemented as a mobile terminal such as a wearable device (for example, a smart watch, a smart glass, a head mounted display (HMD)), or a smartphone, which is capable of exchanging data (or interworking) with other display devices. The wireless communication unit 173 can detect (or recognize) a communicable wearable device that is present relative to the display device 100. Furthermore, if the detected wearable device is a device authenticated to communicate with the display device 100, the control unit 170 can transmit data processed in the display device 100 to the wearable device through the wireless communication unit 173. Accordingly, a user of the wearable device can use the data processed in the display device 100 through the wearable device.

The wireless communication unit 173 can be implemented separate from the external device interface unit 135 and can be included in the external device interface unit 135. The display unit 180 can convert image signals, data signals, or OSD signals, which are processed in the control unit 170, or images signals or data signals, which are received in the external device interface unit 135, into R, G, and B signals to generate driving signals.

The display device 100 shown in FIG. 1 is just one embodiment of the present invention and thus, some of the components shown can be integrated, added, or omitted according to the implemented display device 100. That is, two or more components can be integrated into one component or one component can be divided into two or more components. Additionally, a function performed by each block is to describe an embodiment and its specific operation or device is not so limited.

According to another embodiment, the display device 100 can receive images through the network interface unit 133 or the external device interface unit 135 and play them without including the tuner 131 and the demodulation unit 132. For example, the display device 100 can be divided into an image processing device such as a set-top box for receiving broadcast signals or contents according to various network services and a content playback device for playing contents inputted from the image processing device. In this case, an operating method of the display device can be performed by one of the display device described with reference to FIG. 1, an image processing device such as the separated set-top box, and a content playback device including the display unit 180 and the audio output unit 185.

Figure 2:
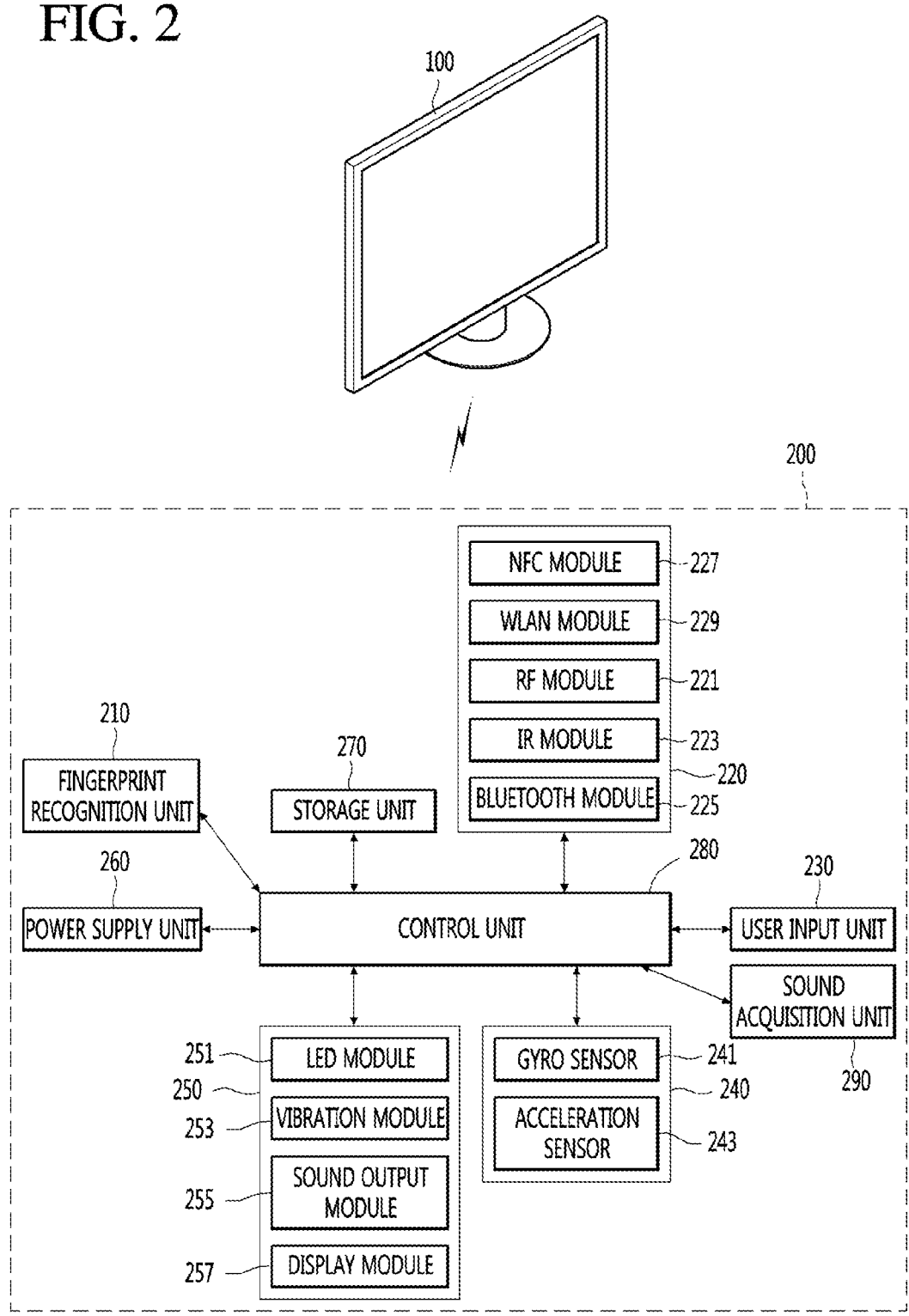
FIG. 2 is a block diagram illustrating a remote control device according to an embodiment of the present invention.
Figure 3:
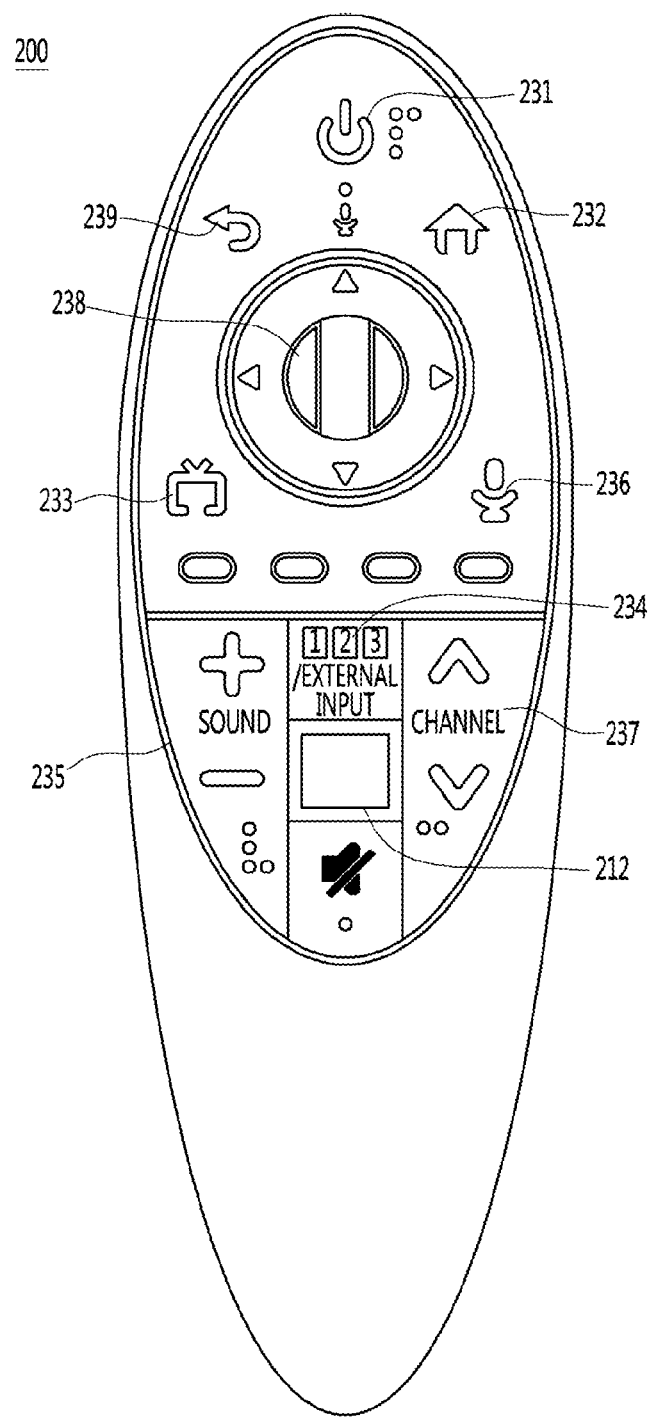
FIG. 3 is a view illustrating a structural configuration of a remote control device according to an embodiment of the present invention.

Reference will now be made to FIGS. 2 and 3, in which FIG. 2 is a block diagram illustrating a remote control device and FIG. 3 is a view illustrating a structural configuration of a remote control device. Referring first to FIG. 2, a remote control device 200 includes a fingerprint recognition unit 210, a wireless communication unit 220, a user input unit 230, a sensor unit 240, an output unit 250, a power supply unit 260, a storage unit 270, a control unit 280, and a voice acquisition unit 290. The wireless communication unit 220 transmits/receives signals to/from any of the display devices described herein.

The remote control device 200 includes an RF module 221 for transmitting/receiving signals to/from the display device 100 according to RF communication standards and an IR module 223 for transmitting/receiving signals to/from the display device 100 according to IR communication standards. Additionally, the remote control device 200 is shown having a Bluetooth module 225 for transmitting/receiving signals to/from the display device 100 according to Bluetooth communication standards, ab NFC module 227 for transmitting/receiving signals to/from the display device 100 according to Near Field Communication (NFC) communication standards, and a WLAN module 229 for transmitting/receiving signals to/from the display device 100 according to Wireless LAN (WLAN) communication standards.

The remote control device 200 can transmit signals containing information on relative movement of the remote control device 200 to the display device 100 through the wireless communication unit 220. Moreover, the remote control device 200 can receive signals transmitted from the display device 100 through the RF module 221 and if desired, can transmit a command to power on/off, channel change, and volume change, to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This feature will be described in more detail with reference to FIG. 3.

Referring to FIG. 3, the remote control device 200 is shown having a plurality of buttons. The plurality of buttons include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 may be a touch pad or other suitable device for recognizing a user's fingerprint. According to an embodiment of the present invention, the fingerprint recognition button 212 can perform a push operation and receive a push operation and a fingerprint recognition operation. The power button 231 can turn on/off the power of the display device 100, power button 232 is for moving to the home screen of the display device 100, live button 233 is for displaying live broadcast programs, external input button 234 permits receiving an external input that is connected to the display device 100.

The voice adjustment button 235 is for adjusting volume output, voice recognition button 236 is to permit receiving a user's voice and recognizing the received voice, channel change button 237 is to permit receiving of broadcast signals of a specific broadcast channel, check button 238 is for selecting a specific function, and back button 239 is for returning to a previous screen.

Some embodiment implements user input unit 230 with a touch screen, in which a user can touch a soft key of the touch screen to input a command relating to the display device 100 to the remote control device 200. Additionally, the user input unit 230 can include various kinds of input devices that can be manipulated by a user, for example, a scroll key and a jog key.

The sensor unit 240 can include a gyro sensor 241 or an acceleration sensor 243 and the gyro sensor 241 can sense information as to movement of the remote control device 200. For example, the gyro sensor 241 can sense operation of the remote control device 200 on the basis of x, y, and z axes and the acceleration sensor 243 can sense relative movement or speed of the remote control device 200. Moreover, the remote control device 200 can further include a distance measurement sensor to sense a distance with respect to the display unit 180 of the display device 100.

The output unit 250 can output an image or voice corresponding to a manipulation of the user input unit 235 or corresponding to signals transmitted from the display device 100. A user can recognize whether the user input unit 235 is manipulated or the display device 100 is controlled through the output unit 250. For example, the output unit 250 can include an LED module 251 for flashing, a vibration module 253 for generating vibration, a sound output module 255 to output sound, or a display module 257 to display an image, if the user input unit 235 is manipulated or signals are transmitted/received to/from the display device 100 through the wireless communication unit 225.

The power supply unit 260 supplies power to the remote control device 200 and if the remote control device 200 does not move for a predetermined time, stops the power supply, minimize power waste. The power supply unit 260 can resume the power supply if a predetermined key provided at the remote control device 200 is manipulated.

The storage unit 270 can store various kinds of programs and application data necessary for control and operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200.

The control unit 280 controls general matters relating to control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

The voice acquisition unit 290 of the remote control device 200 may be implemented to receive audio (e.g., user' voice) and typically includes at least one microphone 291 to receive such audio.

Figure 4A:
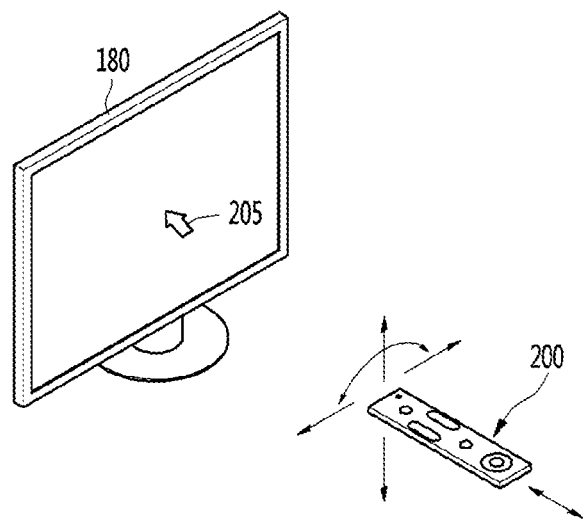
FIGS. 4A-4C depict use of a remote control device according to an embodiment of the present invention.
Figure 4B:
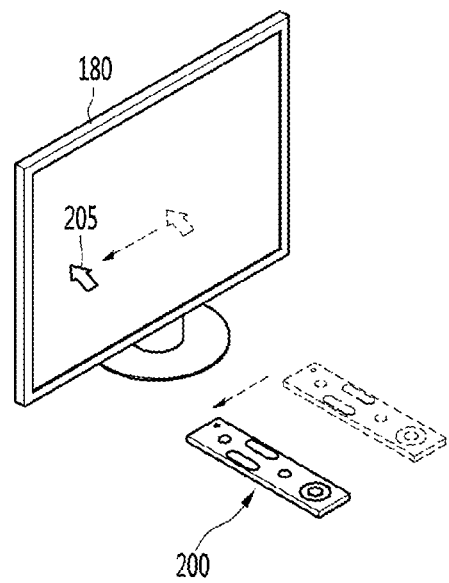
Figure 4C:
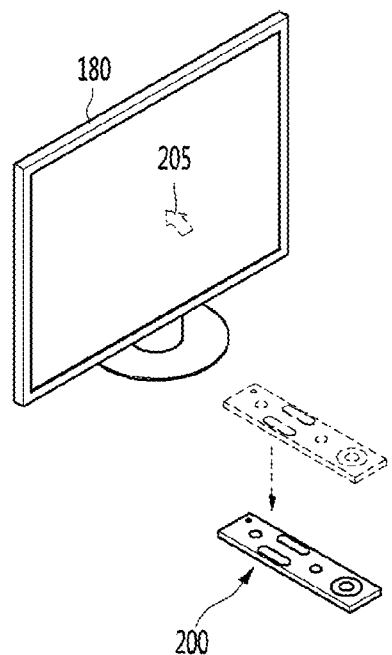

FIGS. 4A-4C depict use of a remote control device according to an embodiment of the present invention. In particular, FIG. 4A shows that a pointer 205 corresponding to the remote control device 200 is displayed on the display unit 180. A user can move or rotate the remote control device 200 vertically or horizontally. The pointer 205 displayed on the display unit 180 of the display device 100 corresponds to a movement of the remote control device 200. Since the corresponding pointer 205 is moved and displayed according to movement on a 3D space as show in the drawing, the remote control device 200 can be referred to as a spatial remote controller.

FIG. 4B shows that if a user moves the remote control device 200, the pointer 205 displayed on the display unit 180 of the display device 100 is moved to the left in correspondence thereto. Information on movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C shows that while a specific button in the remote control device 200 is pressed, a user moves the remote control device 200 away from the display unit 180. Thus, a selection area in the display unit 180 corresponding to the pointer 205 can be zoomed in and displayed larger. On the other hand, if a user moves the remote control device 200 close to the display unit 180, a selection area in the display unit 180 corresponding to the pointer 205 can be zoomed out and displayed in a reduced size. Alternatively, if the remote control device 200 is away from the display unit 180, a selection area can be zoomed out and if the remote control device 200 is positioned closer to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement may not be recognized and only the back and forth movement can be recognized. While a specific button in the remote control device 200 is not pressed, only the pointer 205 is moved according to the up, down, left or right movement of the remote control device 200. The moving speed or moving direction of the pointer 205 can correspond to the moving speed or moving direction of the remote control device 200.

The term "pointer" as used herein refers to an object displayed on the display unit 180 in correspondence to an operation of the remote control device 200. Accordingly, in addition to an arrow form displayed as the pointer 205, various forms of objects are possible. For example, the above concept includes a point, a cursor, a prompt, or a thick outline. The pointer 205 can be displayed in correspondence to one point of a horizontal axis and a vertical axis on the display unit 180 and also can be displayed in correspondence to a plurality of points such as a line and a surface.

Figure 5:
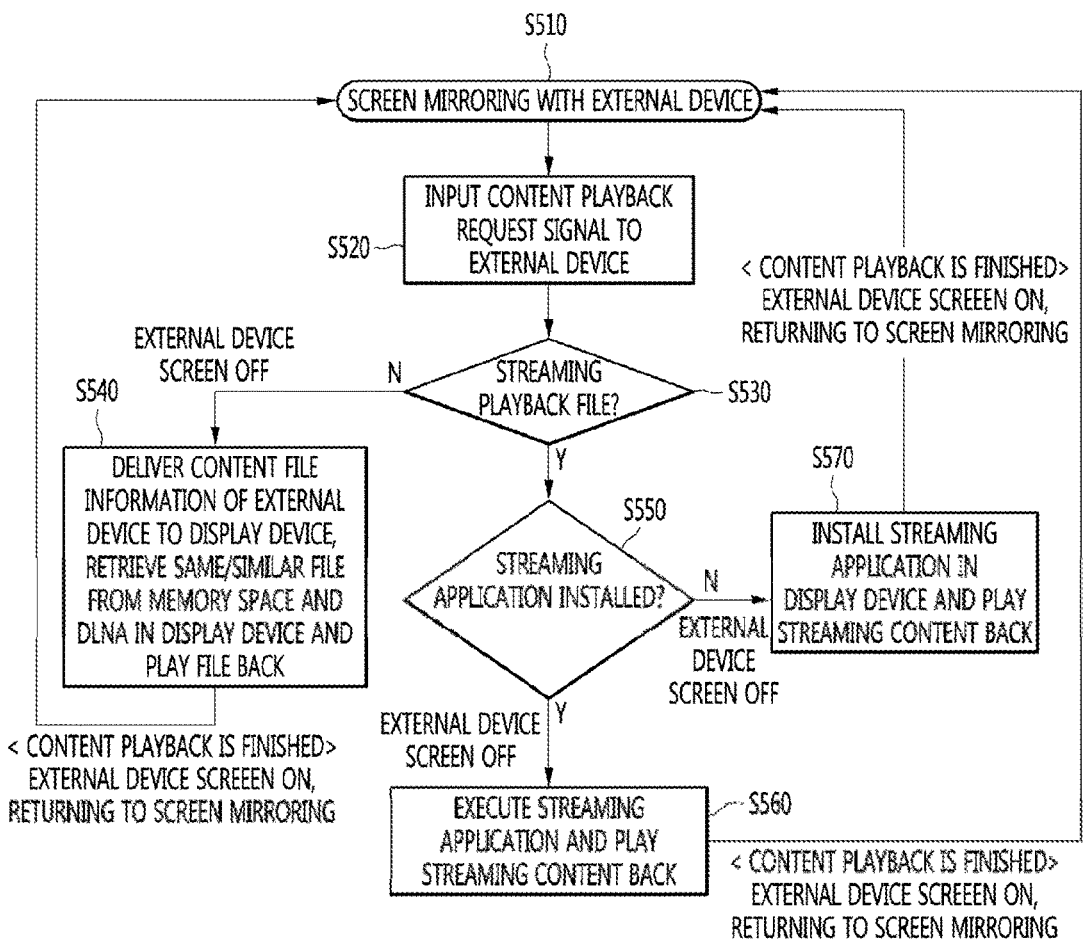
FIG. 5 is a flowchart of an example of a screen mirroring function in a display device according to an embodiment of the present invention.

FIG. 5 is a flowchart of an example of a screen mirroring function in a display device according to an embodiment of the present invention. As shown in FIG. 5, the display device may establish communication with an external device using at least one wireless communication protocol such as Bluetooth to provide a mirroring function (S510).

After establishing communication, a user of the external device may input a content playback request signal to the external device (S520). The content playback request signal may be transmitted to the display device. The content playback request signal may include one or more of a related application, a file storage location, a file name, a file extension, and file resolution information. A controller of the display device may analyze the content playback request signal and determine whether a content file corresponding to the content playback request signal is a streaming playback file (S530).

The controller of the display device may receive media file information from the external device upon determining that the content file is not a streaming playback file, to access a storage when the content file is stored in the storage, retrieve the same or similar content file, to extract content data, and to play content back (S540). The storage may include a memory of the display device, a memory of the external device, or a digital living network alliance (DLNA) or cloud server.

Upon determining that the content file is a streaming playback file, the controller of the display device may determine whether a streaming application is installed in the device (S550). Upon determining that the streaming application is installed in the display device in step S550, the controller of the display device may perform control to execute the streaming application and to play streaming content back (S560).

In contrast, upon determining that the streaming application is not installed in the display device at block S550, the controller of the display device may download and install the streaming application and to play the streaming content (S570). Further, as shown in blocks S540, S560 and S570, when content is played back in the display device, the power mode of the external device is changed to a standby mode to turn a screen off, such that only a minimum amount of power is used. As shown in blocks S540, S560 and S570, when content playback is finished in the display device, the power mode of the external device may enter an awake mode to turn the screen on, such that the display device equally displays the image displayed on the screen of the external device through a screen mirroring function.

Although not shown in FIG. 5, when the content playback request signal is received from the external device, the controller of the display device according to another embodiment of the present invention may perform control to play back content corresponding to the content playback request signal and transmit a standby mode entrance signal to the external device. The content playback request signal may include one or more of a related application, a file storage location, a file name, a file extension and file resolution information.

When the content corresponding to the content playback request signal is streaming playback content, the controller of the display device may perform control to execute the related application included in the content playback request signal and play the streaming playback content. In addition, when a content file corresponding to the content playback request signal is stored in storage, the controller of the display device accesses the storage and plays the content. The storage may include a memory of the display device, a memory of the external device or a cloud server.

When the content playback request signal is received, the controller of the display device may perform control to retrieve a content file using the file storage location and the file name included in the content playback request signal. When content playback is finished, the controller of the display device may transmit an awake mode entrance signal to the external device. The controller of the display device may perform control to predetermine a transmission time of the awake mode entrance signal using predetermined time information or content playback period information. When the external device enters an awake mode, the controller of the display device may display the image on the screen of the external device. When the related application included in the content playback request signal is an uninstalled application, the controller of the display device may download the application. Further, when the content file is not retrieved within a predetermined time, the controller of the display device may transmit the awake mode entrance signal to the external device and to display the image, which is displayed on the screen of the external device.

The power mode of the external device may include a standby mode and an awake mode. The standby mode may include a state in which the screen of the external device may be turned off and a communication or mirroring connection with the display device may be maintained with minimum power. The awake mode may include a state in which the screen of the external device may be turned on and a screen mirroring function is used through a mirroring connection with the display device.

Figure 6:
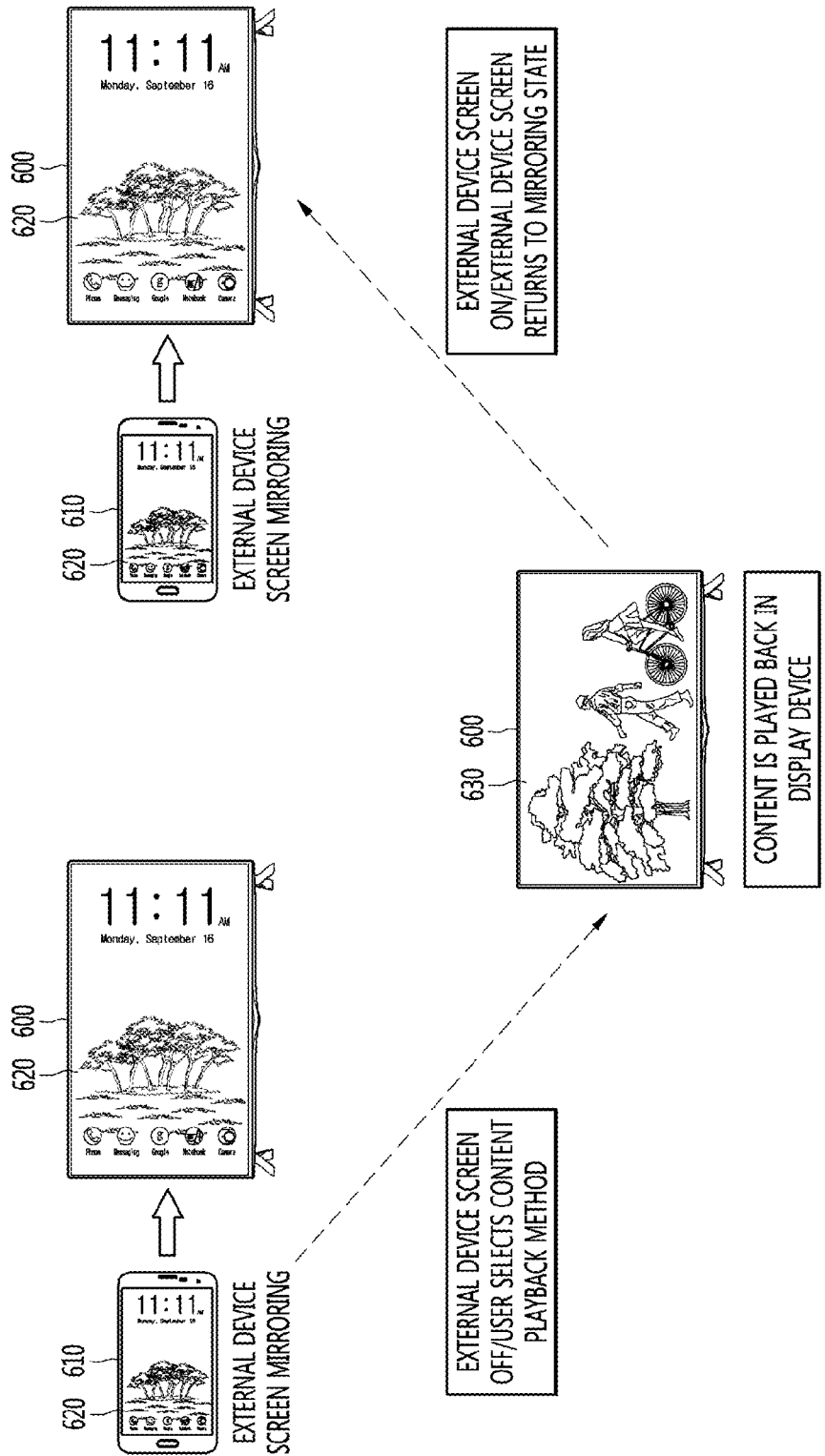
FIG. 6 is illustrates an example of playing content back through a screen mirroring function in a display device according to an embodiment of the present invention.

FIG. 6 is illustrates an example of playing content back through a screen mirroring function in a display device according to an embodiment of the present invention. As shown in this figure, a display device 600 may establish communication with an external device 610 to provide a screen mirroring function for displaying an image 610, which is displayed on the external device 610 and on a screen of the display device 600 without change. When a content playback request signal is received from the external device 600, the controller of the display device 600 may play back an image 630 of content corresponding to the content playback request signal in the display device and transmit a standby mode entrance signal to the external device 610.

The external device 610, which has received the standby mode entrance signal from the display device 600, may change the power mode to a standby mode, turn the screen off, and consume only minimum power. When content playback is finished in the display device 600, the controller of the display device 600 may transmit an awake mode entrance signal to the external device 610 and display the same image 610 on the screen of the display device 600 when the image 610 is displayed on the screen after the external device 610 changes the power mode from the standby mode to the awake mode. When content is played back in the display device, minimum power is used in the external device, thereby increasing power efficiency.

Figure 7:
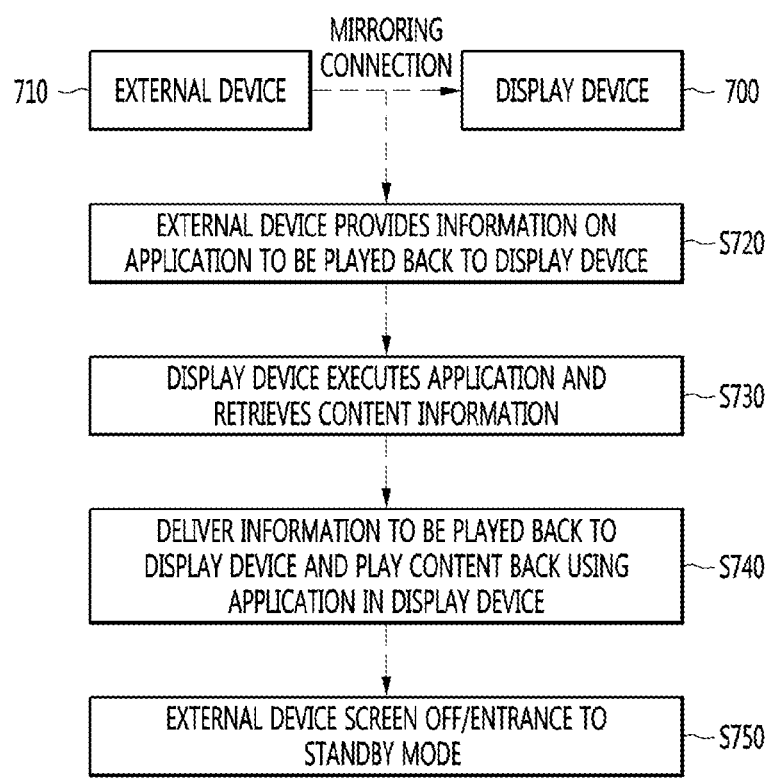
FIG. 7 is a flowchart of an example of playing streaming content back in a display device according to an embodiment of the present invention.

FIG. 7 is a flowchart of an example of playing streaming content back in a display device according to an embodiment of the present invention. As shown in this figure, mirroring connection between a display device 700 and an external device 710 may be performed and content and streaming application information to be played back may be transmitted from the external device 710 to the display device (S720). Thereafter, a controller of the display device 700 may execute the application to retrieve content to be played back or retrieve information on content to be played back from the external device 710 and deliver the result of retrieval to the display device 700 (S730). When information on the content to be played back is retrieved or when the result of retrieving the content to be played back is received from the external device 710, the controller of the display device 710 may perform control to play the content back using the streaming application (S740). While the content is played back in the display device 700, the external device 710 may change the power mode to a standby mode to turn the screen off (S750).

Figure 8:
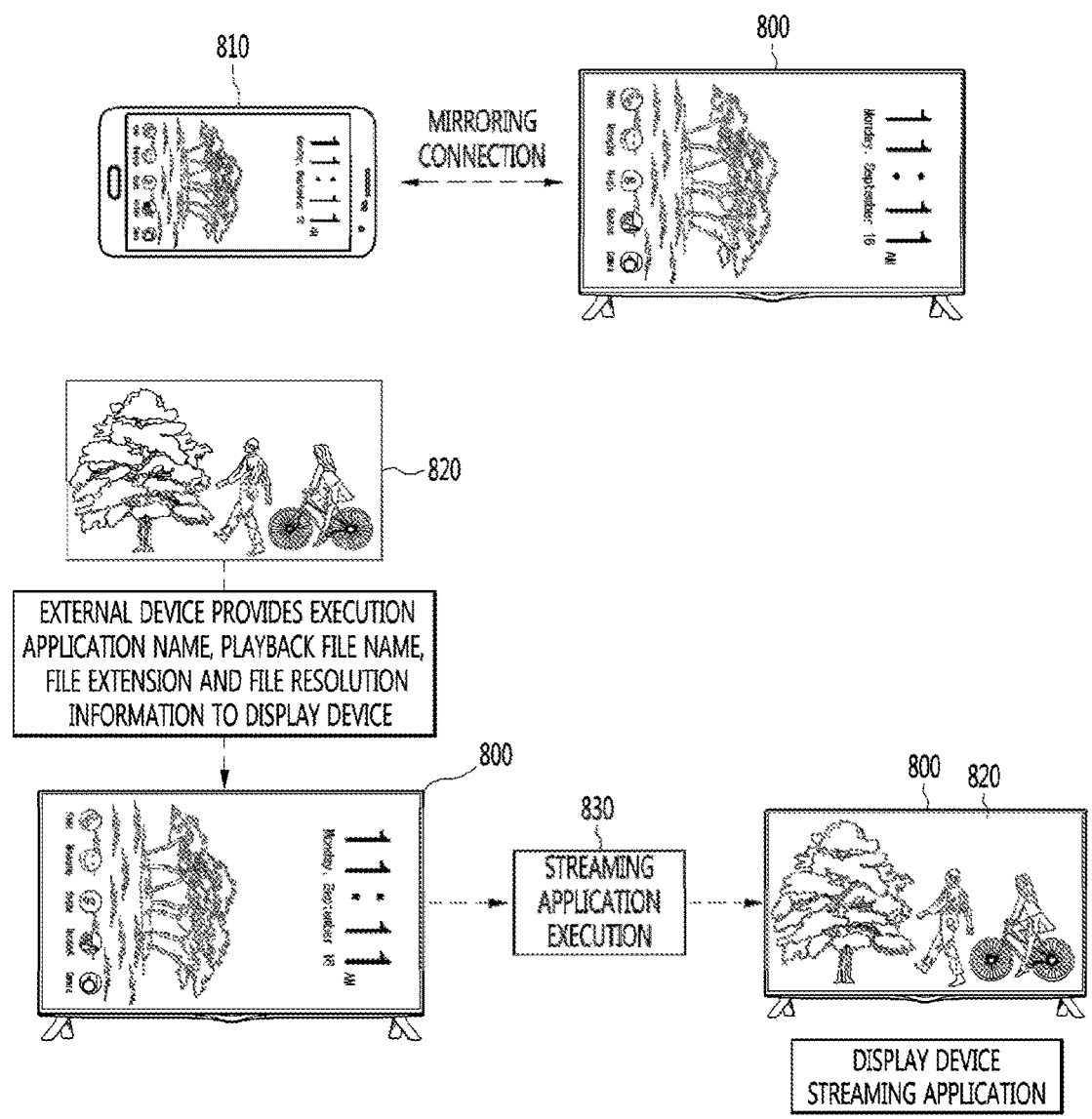
FIG. 8 illustrates another example of playing streaming content back in a display device according to an embodiment of the present invention.

FIG. 8 illustrates another example of playing streaming content back in a display device according to an embodiment of the present invention. As shown in this figure, mirroring connection between a display device 800 and an external device 810 may be performed and a signal for requesting playback of content 820 through a streaming application 830 may be received from the external device 810. The signal for requesting playback of the content 820 may include application information to be executed, content file name information to be played back, file extension information, file resolution information, and the like. A controller of the display device 800 may perform control to analyze the signal for requesting playback of the content 820, to execute the streaming application 830 and to play the content 820 back.

Figure 9:
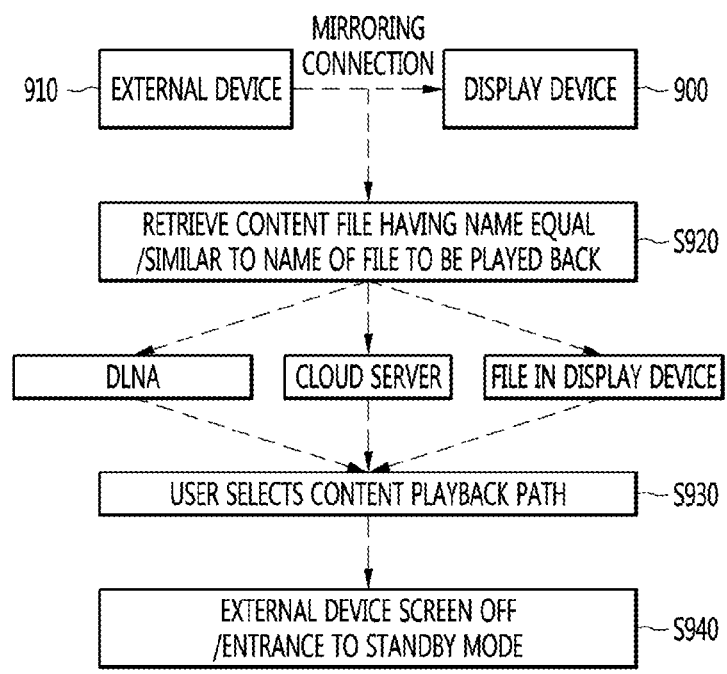
FIG. 9 is a flowchart of an example of playing storage content back in a display device according to an embodiment of the present invention.

FIG. 9 is a flowchart of an example of playing storage content back in a display device according to an embodiment of the present invention. As shown in this figure, a display device 900 may perform mirroring connection using a wireless communication method with an external device 910 and receive a content playback request signal from the external device 910. A controller of the display device 900 may retrieve a content file having a content file name equal to or similar to that of a content file to be played back using the file name information included in the content playback request signal from various storages (S920). The various storages may include a memory of the display device 900, a memory of the external device 910, a Digital Living Network Alliance (DLNA) or cloud server. When a plurality of paths is retrieved, the controller of the display device 900 may select a content playback path from among the plurality of paths, to extract the content data from the storage corresponding to the selected content playback path, and to play the content (S930). At this time, while the content is played in the display device 900, the external device 910 may change the power mode to the standby mode to turn the screen off (S940).

Figure 10:
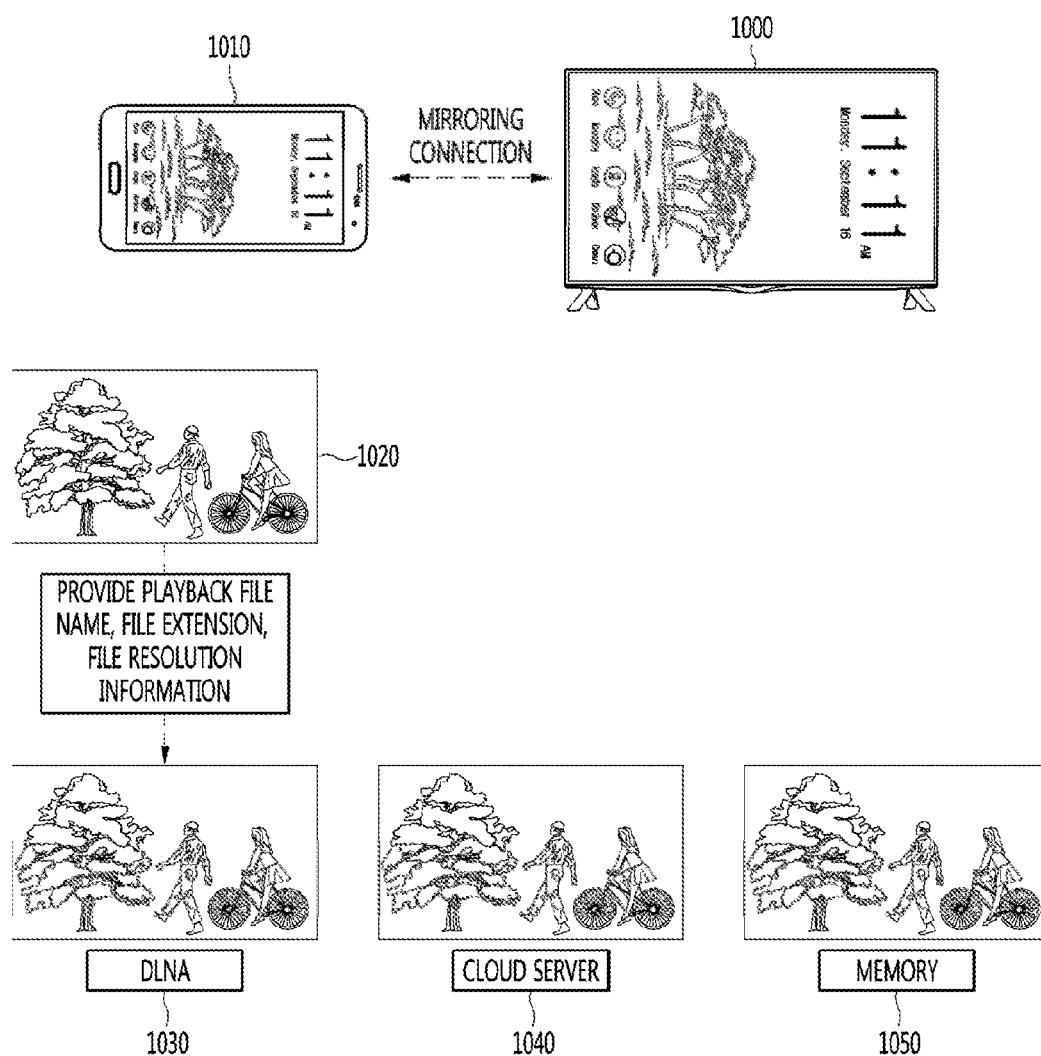
FIG. 10 illustrates another example of playing storage content back in a display device according to an embodiment of the present invention.

FIG. 10 illustrates another example of playing storage content back in a display device according to an embodiment of the present invention. As shown in this figure, a mirroring connection is performed between a display device 1000 and an external device 1010 and the display device may receive a content playback file name, a file extension and file resolution information from the external device 1010. A controller of the display device 1000, which has received the above information, may determine whether a related content file is stored in predetermined storages (e.g., DLNA, a cloud server, a display device or a memory of the external device). Upon determining that the related content file is stored, the controller of the display device 1000 may access the storage in which the content file is stored, to extract content data and to play content 1020 requested by a user back.

Figure 11:
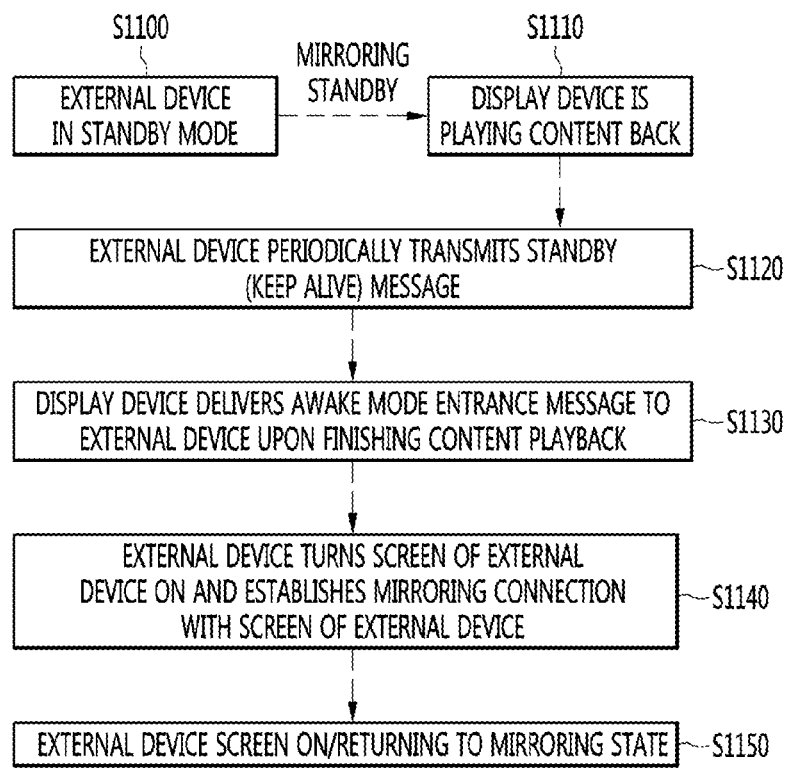
FIG. 11 is a flowchart of an example of finishing content playback and returning to a mirroring state in a display device according to an embodiment of the present invention.

FIG. 11 is a flowchart of an example of finishing content playback and returning to a mirroring state in a display device according to an embodiment of the present invention.

In this figure, while a display device plays content, an external device may set a power mode to a standby mode, turn a screen off, and enter a mirroring standby state (S1100). At this time, the display device may play the content back (S1110). While content playback is performed in the display device, the external device may periodically transmit a standby message to the display device (S1120). Thereafter, when content playback is finished, a controller of the display device may deliver a signal for changing the power mode from the standby mode to an awake mode to the external device (S1130). The external device, which has received the signal, may turn the screen on and establish a mirroring connection with the display device (S1140). Thereafter, the display device may display an image, which is displayed on the screen of the external device, on the screen thereof using a screen mirroring function and return to a mirroring state (S1150).

Figure 12:
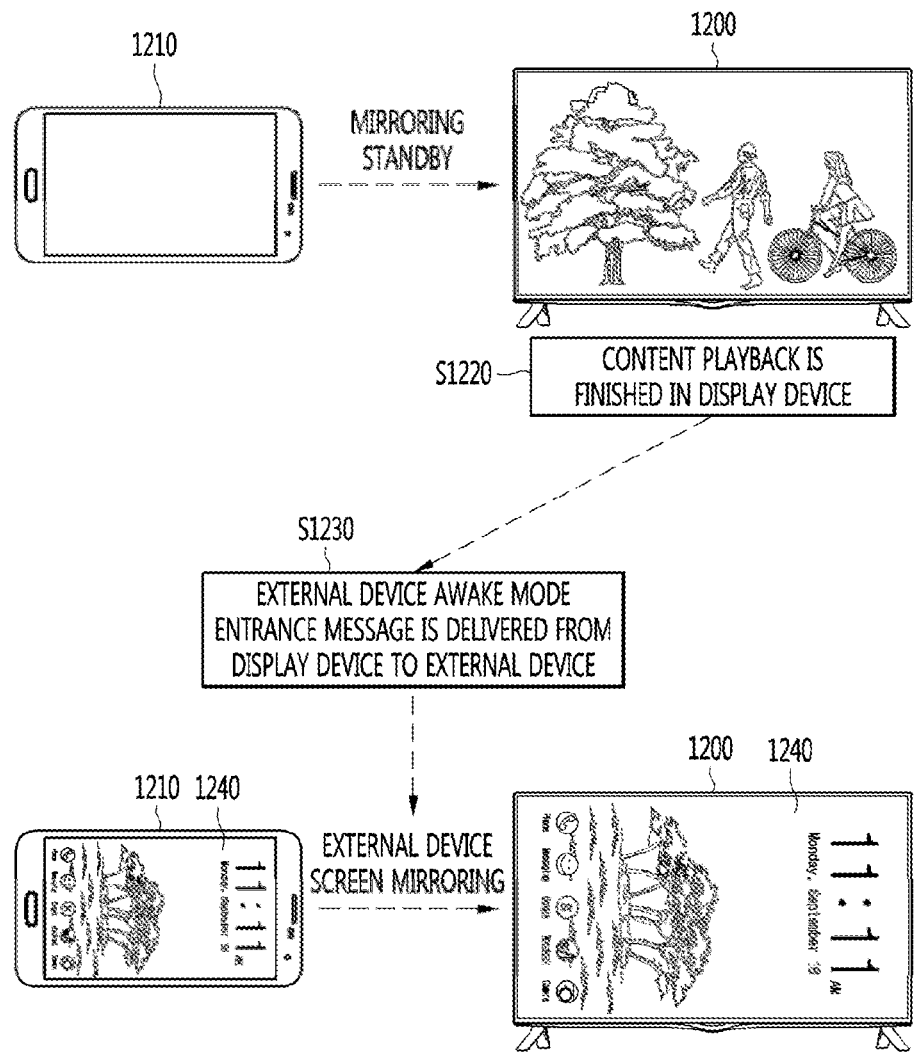
FIG. 12 is a diagram illustrating another example of finishing content playback and returning to a mirroring state in a display device according to an embodiment of the present invention.

FIG. 12 is a diagram illustrating another example of finishing content playback and returning to a mirroring state in a display device according to an embodiment of the present invention.

As shown in FIG. 12, while content playback is performed in a display device 1200, an external device 1210 may set a power mode to a standby mode, turn a screen off and enter a mirroring standby state. Thereafter, when content playback is finished (S1220), a controller of the display device 1200 may deliver a signal for changing the power mode from the standby mode to an awake mode to the external device 1210 (S1230). The external device 1210, which has received the signal, may turn the screen on and establish mirroring connection with the display device 1200. Thereafter, the display device 1200 may display an image 1240, which is displayed on the screen of the external device 1210, on the screen thereof using a screen mirroring function and return to a mirroring state (S1150).

Figure 13A:
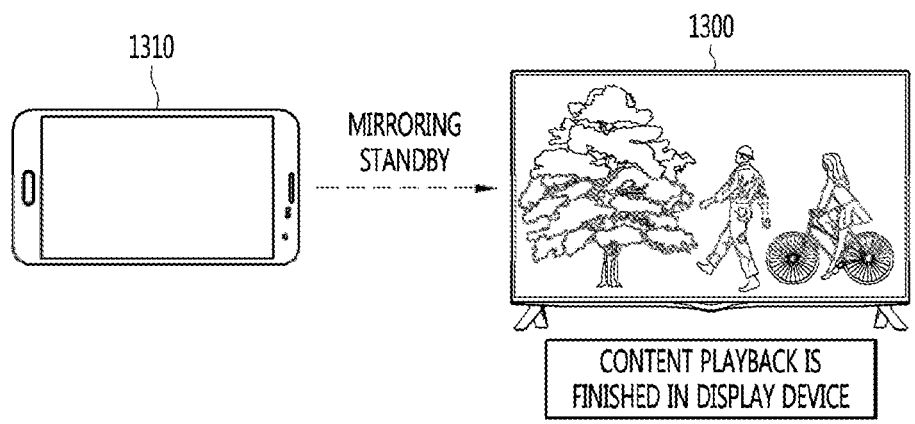
FIGS. 13A-13C illustrate various examples in which a display device according to an embodiment of the present invention returns to a mirroring state with an external device.
Figure 13B:
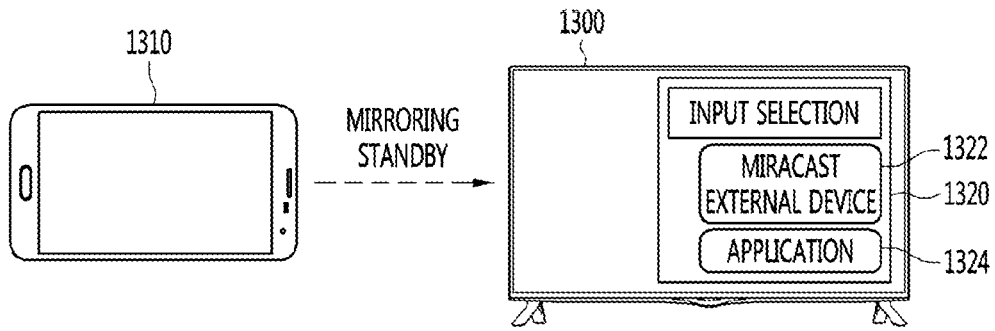
Figure 13C:
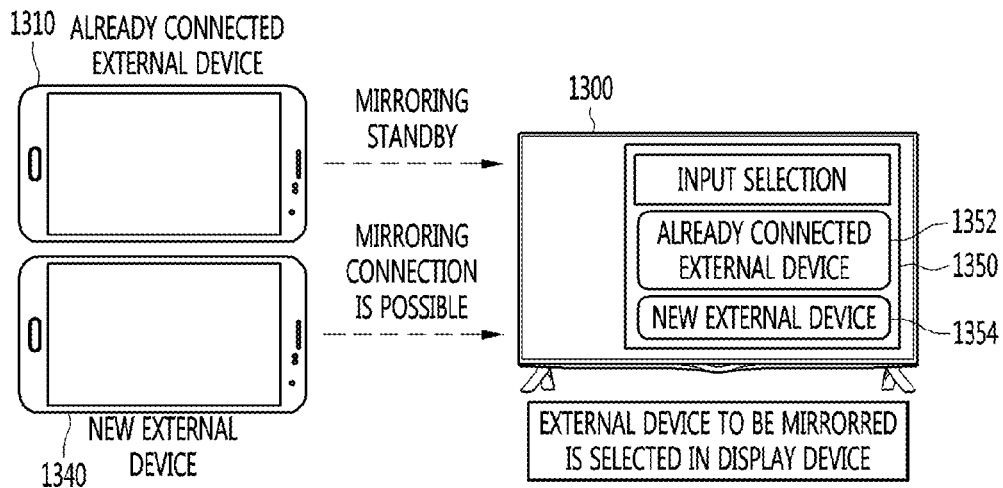

FIGS. 13A-13C illustrate various examples in which a display device according to an embodiment of the present invention returns to a mirroring state with an external device. In FIG. 13A, while content playback is performed in display device 1300, an external device 1310 may minimize power in a standby mode state and maintain a mirroring standby state. As shown in FIG. 13B, when content playback is finished, a controller of the display device 1300 may perform control to display a mirroring screen selection window 1320. The mirroring screen selection window 1320 may include a first selection item 1322 for performing mirroring connection between the display device 1300 and the already mirrored external device 1320 and a second selection item 1324 for displaying an application for executing content without mirroring connection or a predetermined application on the screen. Accordingly, the controller of the display device 1300 may perform mirroring connection with the external device 1310 and display an image, which is displayed on the external device 1310, on the screen when a user selects the first selection item 1322 and to display a specific application on the screen when the user selects the second selection item 1324.

Alternatively, as shown in FIG. 13C, when content playback is finished, the controller of the display device 1300 may perform control to display a mirroring device selection window 1350. The mirroring device selection window 1350 may include a first selection item 1352 for performing mirroring connection with a first external device 1310 for already performing mirroring connection and a second selection item 1354 for performing mirroring connection with a second external device 1340 for performing new mirroring connection. Accordingly, the controller of the display device 1300 may perform mirroring connection with the first external device 1310 and to equally display an image, which is displayed on the first external device 1310, on the screen when the user selects the first selection item 1352 and perform mirroring connection with the second external device and to equally display an image, which is displayed on the second external device 1340, on the screen when the user selects the second selection item 1354.

Figure 14A:
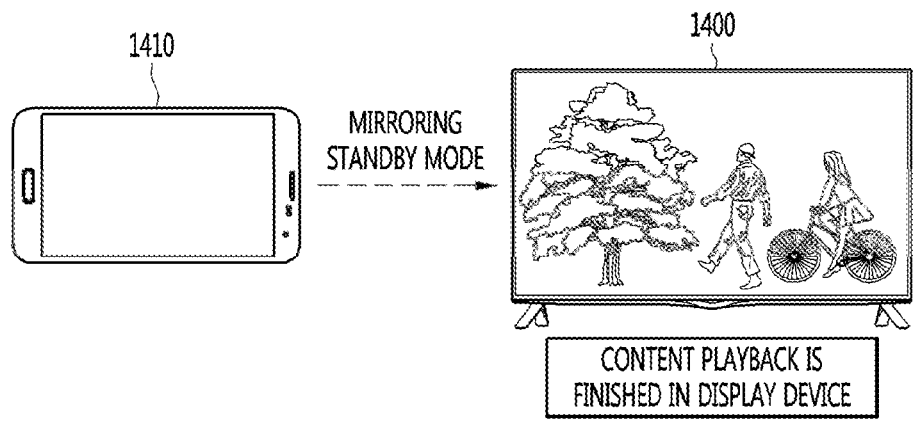
FIGS. 14A-14C illustrating examples in which a display device according to an embodiment of the present invention returns to a mirroring state with an external device.
Figure 14B:
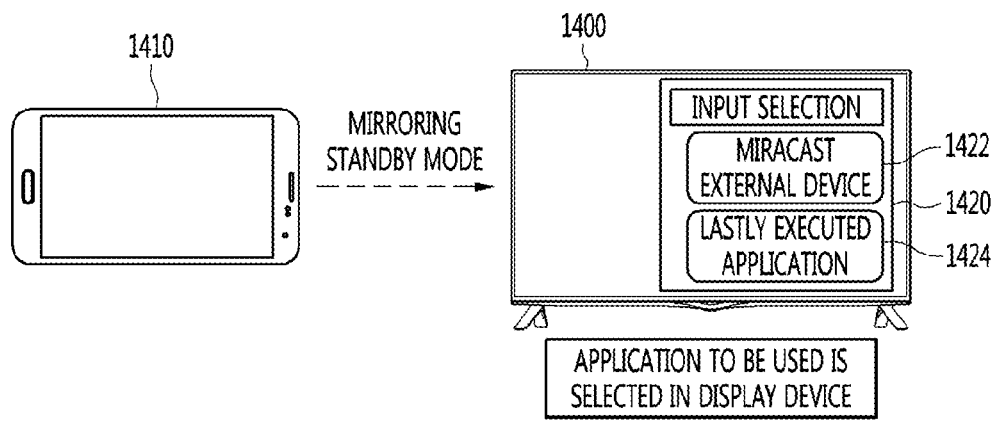
Figure 14C:
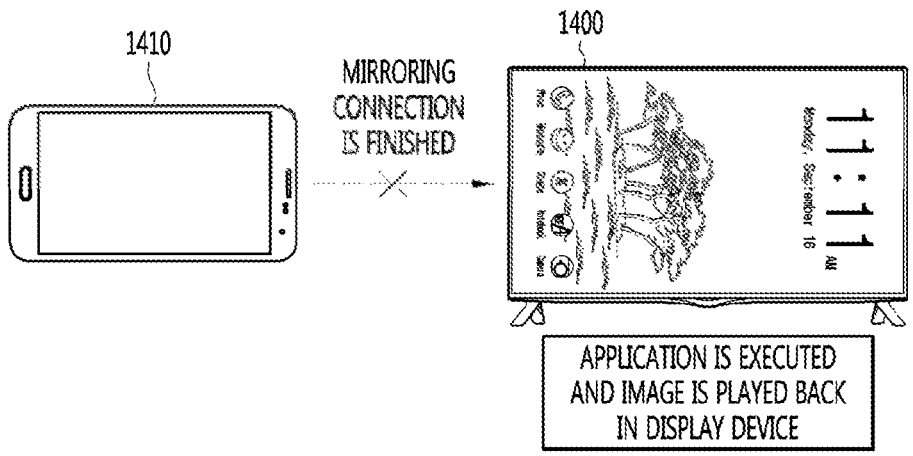

FIGS. 14A-14C illustrating examples in which a display device according to an embodiment of the present invention returns to a mirroring state with an external device. As shown in FIG. 14A, while content playback is performed in a display device 1400, an external device 1410 may minimize power in a standby mode state and maintain a mirroring standby state.

As shown in FIG. 14B, when content playback is finished, a controller of the display device 1400 may display a mirroring screen selection window on a screen. The mirroring screen selection window 1420 may include a first selection item 1422 for performing mirroring connection between the display device 1400 and an already mirrored external device 1410 and a second selection item 1424 for displaying an application lastly executed in the display device on a screen without mirroring connection. Accordingly, the controller of the display device 1400 may perform control to perform mirroring connection with the external device 1410 and to equally display an image, which is displayed on the external device 1410, on the screen, when the user selects the first selection item 1422. In contrast, the controller of the display device 1400 may completely finish a mirroring connection with the external device 1410 and display a lastly executed application on the screen, when the user selects the second selection item 1424.

As described with reference to FIGS. 13A-13C, the display device and the external device may be in a mirroring connection state or a mirroring standby state for preparing the mirroring connection state. The mirroring standby state is changed to the mirroring connection state through a brief RTSP message. In contrast, as shown in FIG. 14C, when mirroring connection between the display device and the external device is completely finished, the user should manually perform mirroring connection between the display device and the external device in order to use the mirroring function.

According to an embodiment of the present invention, the above-described method may be implemented as code written to a processor-readable recording medium and can thus be read by a processor. Examples of the processor-readable recording medium include a ROM, a RAM, a CD-ROM, a magnetic tape, a floppy disk, an optical data storage, and a carrier wave (e.g., data transmission over the Internet).

The display device according to the present invention should not be limited to configurations and methods of the above-described embodiments, and all or some of the embodiments may be selectively combined with one another to achieve various alterations.

What is claimed is:

1. A display device, comprising:
a display;
a storage unit;
a device interface to permit communication with an external device using at least one wireless communication protocol;
a network interface for coupling to a network; and
a controller configured to:
cause the display to display data mirroring data displayed on an external device;
receive a request for playback of content from the external device via the device interface, wherein the request for playback of the content includes data for a related application, a file storage location, a file name, a file extension and a file resolution;
execute playback of the content by obtaining the content from the storage unit using the file name included in the request for playback of the content when the content is non-streaming content;
execute playback of the content by obtaining the related application, via the network interface, when the content is streaming content;
cause the display to display the content obtained from either the storage unit or the network interface;
transmit, via the device interface, a first message to the external device to cause the external device to enter a standby mode;
determine whether the content is the streaming content or the non-streaming content when the request for playback of content is received;
determine whether the related application is installed in the storage unit when it is determined that the content is the streaming content;
execute the content by executing the related application stored in the storage unit when it is determined that the related application is installed; and
install the related application, via the network interface, and execute the installed related application when it is determined that the related application is not installed.

2. The display device of claim 1, wherein the controller is further configured to:
cause the display to display a selection window upon completion of the displaying of the content, wherein the selection window comprises a first item to mirror data from the external device on the display device and a second item for displaying content on the display device without need of a connection to the external device.

3. The display device of claim 1, wherein the controller is further configured to:
transmit, via the device interface, a second message to the external device upon completion of the displaying of the content, wherein the second message causes the external device to enter an awake mode.

4. The display device of claim 3, wherein the controller is further configured to:
transmit the second message to the external device according to a playback period information of the content or predetermined time information.

5. The display device of claim 4, wherein the controller is further configured to:
cause the display to display further data mirroring further data displayed on the external device when the external device enters the awake mode.

6. The display device of claim 1, wherein the controller is further configured to:
transmit, via the device interface, a second message to the external device, and cause the display to display further data mirroring further data displayed on the external device, when the content is not retrieved within a predetermined time, wherein the second message causes the external device to enter an awake mode.

7. A display method for a display device having a display, the method comprising:

communicating, via a device interface, with an external device using at least one wireless communication protocol;

coupling to a network via network interface;

displaying, on the display, data that mirrors data displayed on an external device;

receiving a request for playback of content from the external device via the device interface, wherein the request for playback of the content includes data for a related application, a file storage location, a file name, a file extension and a file resolution;

executing playback of the content by obtaining the content from a storage unit using the file name included in the request for playback of the content when the content is non-streaming content;

executing playback of the content by obtaining the related application, via the network interface, when the content is streaming content;

displaying, on the display, the content obtained from either the storage unit or the network interface;

transmitting, via the device interface, a first message to the external device to cause the external device to enter a standby mode;

determining whether the content is the streaming content or the non-streaming content when the request for playback of content is received;

determining whether the related application is installed in the storage unit when it is determined that the content is the streaming content;

executing the playback of the content by executing the related application stored in the storage unit when it is determined that the related application is installed; and installing the related application via the network interface, and executing the installed related application when it is determined that the related application is not installed.

8. The method of claim 7, further comprising:

displaying, on the display, a selection window upon completion of the displaying of the content, wherein the selection window comprises a first item to mirror data from the external device on the display device and a second item for displaying content on the display device without need of a connection to the external device.

9. The method of claim 7, further comprising:

transmitting, via the device interface, a second message to the external device upon completion of the displaying of the content, wherein the second message causes the external device to enter an awake mode.

10. The method of claim 9, further comprising:

transmitting the second message to the external device according to a playback period information of the content or predetermined time information.

11. The method of claim 10, further comprising:

displaying, on the display, further data mirroring further data displayed on the external device when the external device enters the awake mode.

12. The method of claim 7, further comprising:

transmitting, via the device interface, a second message to the external device, and cause the display to display further data mirroring further data displayed on the external device, when the content is not retrieved within a predetermined time, wherein the second message causes the external device to enter an awake mode.

* * * * *